United States Patent [19]
Reedman et al.

[11] Patent Number: 5,210,897
[45] Date of Patent: May 18, 1993

[54] PULLING OVER AND TOE LASTING MACHINES

[75] Inventors: David C. Reedman, Wartnaby; Frank C. Price, Leicester, both of England

[73] Assignee: DVSG Engineering und Patentverwaltungs GmbH, Frankfurt am Main, Fed. Rep. of Germany

[21] Appl. No.: 833,359

[22] Filed: Feb. 10, 1992

[30] Foreign Application Priority Data

Feb. 12, 1991 [GB] United Kingdom ............... 9102926

[51] Int. Cl.$^5$ ............................................. A43D 21/00
[52] U.S. Cl. .......................................... 12/7; 12/12; 12/12.2; 12/12.4; 12/1 R
[58] Field of Search ................. 12/1 R, 7, 12, 12.2, 12/12.4, 1 W

[56] References Cited

U.S. PATENT DOCUMENTS

| | | | |
|---|---|---|---|
| 4,653,133 | 3/1987 | Giebel | 12/12.2 |
| 4,688,288 | 8/1987 | Giebel et al. | 12/12.2 |
| 4,945,593 | 8/1990 | Giebel et al. | 12/12 |
| 4,996,012 | 2/1991 | Gierschewski et al. | 12/1 R |

FOREIGN PATENT DOCUMENTS

| | | |
|---|---|---|
| 124229 | 11/1984 | European Pat. Off. |
| 646383 | 6/1937 | Fed. Rep. of Germany |
| 963972 | 7/1964 | United Kingdom |
| 9117021 | 11/1991 | World Int. Prop. O. |

Primary Examiner—Steven N. Meyers
Assistant Examiner—M. Denise Patterson
Attorney, Agent, or Firm—Owen J. Meegan; Aubrey C. Brine

[57] ABSTRACT

For accurately positioning a shoe upper on its last preliminarily to a pulling over and toe lasting operation, the machine comprises an optical scanning system (20) by which, in cooperation with a central processor unit (22), coordinate axis values can be determined for selected portions of the topline region of the shoe upper (the "actual" values) and be compared with a set of taught data relevant to the shoe style, such taught data representing the positions in which the selected portions of the topline region of the shoe upper are to be located (the "should be" values), the central processor unit (22) comparing the actual and "should be" values and supplying correction signals to motors (16) associated one with each of the pincers (10, 12) whereby the shoe upper is selectively tensioned in order to achieve the desired location of the topline region of the shoe upper on its last.

5 Claims, 1 Drawing Sheet

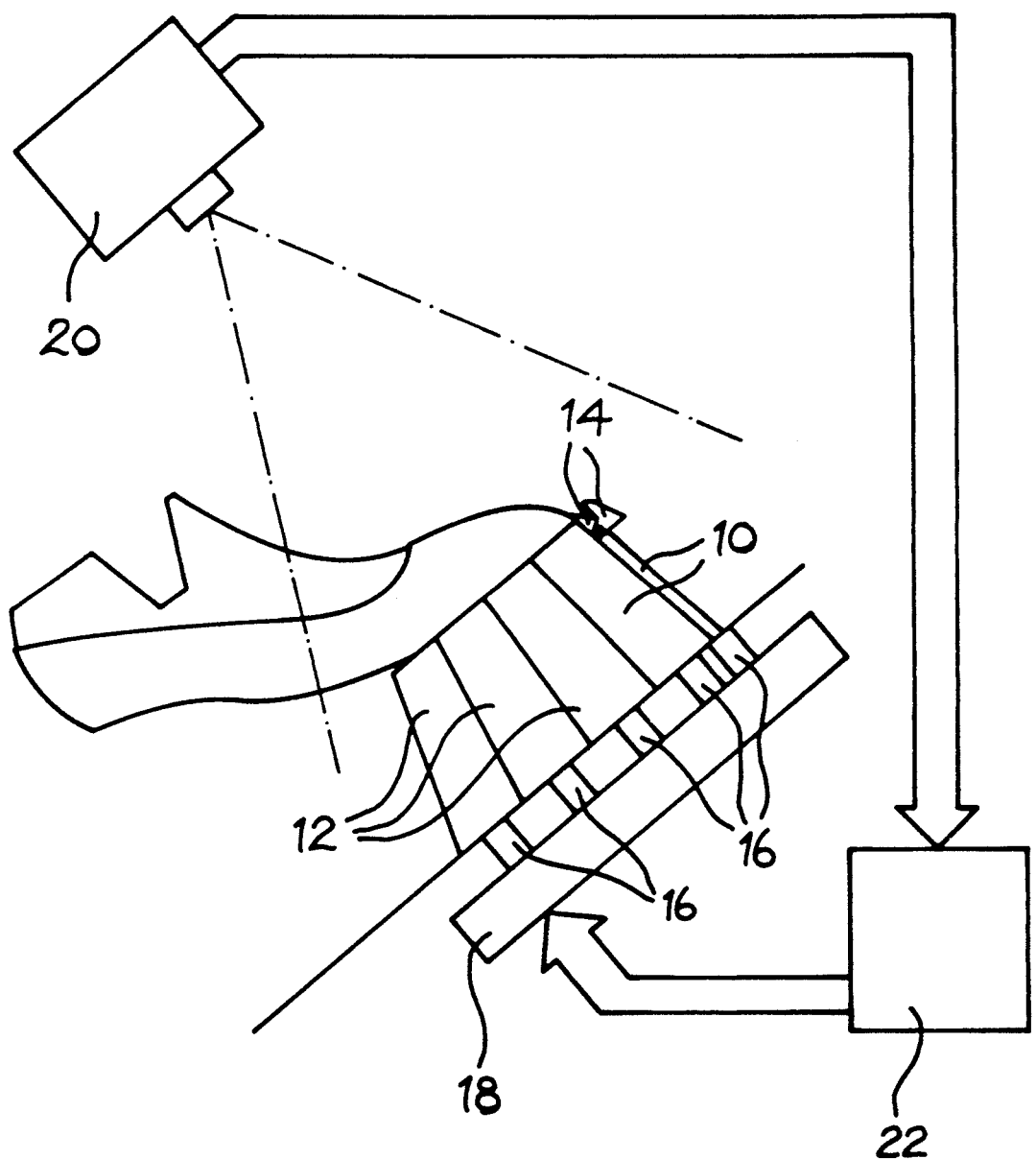

PULLING OVER AND TOE LASTING MACHINES

BACKGROUND OF THE INVENTION

This invention is concerned with pulling over and toe lasting machines of the type comprising a last support, arranged at an operating locality of the machine, for supporting a shoe comprising a shoe upper on a last and an insole on the last bottom, an array of pincers, comprising at least one toe pincer and two sets of side pincers, arranged in a generally U-shaped configuration about the last support, by which pincers the shoe upper of a shoe supported by the last support can be gripped in the region of the lasting margin thereof, and motor means whereby relative heightwise movement can be caused to take place between the last support and the pincers such that a shoe upper gripped as aforesaid can be tensioned over its last, said means comprising individual motors, one associated with each of the pincers.

Using such a machine, in which conventionally the shoe is supported bottom down on the last support, the shoe upper is customarily tensioned by the operation of the motor means effecting relative heightwise movement between the last support and the array of pincers as a unit, e.g. by raising the last support relative to the array of pincers, and thereafter, by using so-called "discretionary pull" levers, the operator can effect operation of the individual motors associated with the side pincers to correct the position of the shoe upper on its last and to satisfy himself that the shoe upper is correctly positioned on its last, prior to the operation of the wiping means. In order to assist the operator in locating the upper on the last so-called cap and throat gauge means may be provided, e.g. in the form of a light pattern which is projected onto the operating locality of the machine, or in some instances actual gauging means are scribed or otherwise provided on the surface of the last. The location of the upper on its last prior to wiping is of course a function which requires a great deal more skill than any other feature of the lasting operation, and it is of course relatively time-consuming.

OBJECT OF THE INVENTION

It is the object of the present invention to provide an improved pulling over and toe lasting machine in which the dependence upon the skill of the operator for correctly locating a shoe upper on its last can be minimised if not indeed eliminated.

SUMMARY OF THE INVENTION

This object is resolved in accordance with the present invention, in one of its several aspects, in a machine as set out in the first paragraph above, by the provision of optical means for scanning selected portions of the topline region of the shoe upper during the tensioning operation and for generating signals representative of the actual position of each selected portion of said topline region in relation to the operating locality of the machine, and processor means by which such signals are compared with a set of taught data representative of the position in which each selected portion of said topline region should be located and, if, and to the extent that, any such signal has a value which does not equal that of the taught data with which it is being compared, a correction signal is generated in response to which one or more of the individual motors are actuated as appropriate to bring the topline region of the shoe upper into a position as represented by the taught data.

It will thus be appreciated that, using the machine in accordance with the present invention, the positioning of the upper on its last can now be achieved without reliance upon the skill of the operator, once the taught data has been established. For providing the taught data any conventional system may be used; for example the machine can be "taught" by a skilled operator actually carrying out a pulling over and lasting operation with the machine under manual control, the optical means being used to identify the selected portions of the topline region of the shoe upper when correctly positioned according to that operator whereafter the necessary data relating to the positions of such selected portions is stored. Alternatively, where the shoe is designed on a CAD/CAM system, the positions of selected portions of the topline region are determined as part of the style of the shoe and can thus readily be translated into data which can then be used in the pulling over and toe lasting machine in accordance with the present invention.

It will also be appreciated that, where the machine is "taught" by a skilled operator as aforesaid, it is still necessary, as with conventional pulling over and toe lasting machines, for the shoe to be supported bottom down on the last support. Where, on the other hand, the taught data is acquired by different means independently of the machine, it is possible to support the shoe bottom uppermost, since now it is no longer necessary for the operator to be able to view the topline region of the shoe and it may be regarded as more convenient, especially where the machine is loaded automatically, for the shoe to be supported bottom uppermost. One particular advantage resides in supporting the shoe and locating it accurately at the operating locality of the machine, which location currently with conventional machines relies upon the operator once more.

The optical means may comprise any conventional scanning system currently available. One example of such optical means is constituted by a plurality of linescan cameras arranged to scan the selected portions of the topline region of the shoe upper; in one embodiment three such cameras are provided, one being located at the most toeward portion of the throat of the shoe upper and the other two at opposite sides; in certain cases, however, the most toeward camera could be dispensed with, depending upon the pattern. Alternatively, the optical means may comprise a two-dimensional CCD array by which the whole of the forepart of the topline region of the shoe upper can be scanned; in such a case, moreover, the processor means itself may be utilised for selecting from the signals generated by such array those corresponding to the taught data with which they are then compared as aforesaid.

Preferably in carrying out the invention the taught data comprises coordinate values for the light/dark boundary between the shoe upper, in the throat region thereof, and the shoe last; to this end conveniently the latter is provided with a contrasting colour or surface or texture in order to identify the boundary more readily. Alternatively, the selected portions may comprise other features than the boundary, again depending upon the particular pattern or indeed style of the shoe.

In conventional pulling over and toe lasting machines the individual motors of the motor means are fluid pressure operated, whether hydraulically or pneumatically operated. Similar motors may be provided in a machine in accordance with the present invention, but in this case instead of such motors being operated under operator control, e.g. through the "discretionary pull" levers, the actuation/operation of the motors is individually controlled in accordance with the correction signals generated by the processor means as aforesaid. Alternatively, however, the individual motors of the motor means may comprise n.c. motors (as hereinafter defined) actuation of which is controlled in accordance with the correction signals generated by the processor means. (By the phrase "n.c. motor", where used herein, is to be understood a motor the operation of which is controlled by control pulses supplied thereto in accordance with digitised information appropriate to the desired operation of the motor. Examples of such motors are stepping motors and d.c. servo motors.)

As in conventional machines, also in a machine in accordance with the present invention the motor means may be initially operable to cause the last support to be raised relative to the array of pincers whereby to impart an initial tensioning to the shoe upper prior to the operation of the individual motors as aforesaid.

The present invention so far as described above is directed towards replacing the skill of the operator by the optical means and processor means in the manner described. Alternatively, however, it is possible using the machine in accordance with the present invention to carry out a preliminary positioning of a shoe upper at the operating locality of the machine prior to the full tensioning operation as described above. With this end in mind, conveniently prior to the signals generated by the optical means being compared with the set of taught data with consequent actuation of the individual motors as aforesaid said signals are initially compared with a second set of taught data representative of an initial position into which selected portions of the topline region of the shoe upper are to be brought and correction signals are appropriately generated in response to which the individual motors are actuated to bring said portions of the shoe upper into such initial position. After such preliminary positioning of the shoe upper it is then tensioned, preferably without further correction being necessary, although if desired, the first-mentioned set of taught data may also be provided for facilitating further correction, in the manner described above.

The object of the invention may thus alternatively be resolved, in accordance with the present invention in another of its several aspects, in a machine as set out in the first paragraph above, by the provision of optical means for scanning selected portions of the topline region of the shoe upper during the tensioning operation and for generating signals representative of the actual position of each selected portion of said topline region in relation to the operating locality of the machine, and processor means by which such signals are compared with a set of taught data representative of an initial position in which each selected portion of said topline region is to be located and, if, and to the extent that, any such signal has a value which does not equal that of the taught data with which it is being compared, a correction signal is generated in response to which one or more of the individual motors are actuated as appropriate to bring the topline region of the shoe upper into said initial position as represented by the taught data, whereafter the motor means is operated further to effect relative heightwise movement between the last support and the array of pincers as a unit to tension the shoe upper over its last.

It will thus be appreciated that, using the machine in accordance with the invention, whether in its first or second aspects as set out above, the need for a skilled operator can be dispensed with (other than for "teaching" the machine, if that is the manner in which the taught data is obtained) while still enabling the shoe to be accurately and reliably positioned at the operating locality of the machine prior to the operation of the wiping means. It will of course be appreciated further that, although the operator, using a conventional machine, concentrates on locating the topline in an accurately defined position, whether the shoe can 'e properly lasted is also determined by the stretchability of material of which the upper is made and also the size to which the shoe upper is cut; in particular, it is desirable that the lasting margin be within relatively close width tolerances, since if it is too small there will be insufficient material to secure to the insole, whereas if it is too large the surfeit of material may preclude the upper from being tensioned properly and thus drawn tightly around the last. In particular when the upper is cut too short, it is often the case that the operator must increase the applied pressure, in order thereby to stretch the upper further. In the machine in accordance with the present invention, therefore, where the individual motors of the motor means are fluid pressure operated, the pressure supplied to the motors may be varied in order to ensure that the selected portions of the topline region are drawn to the positions represented by the taught data.

It will of course be appreciated that the various pincers are interdependent so that pulling on one pincer may disturb the position of a different portion of the topline region of the shoe, thereby requiring actuation of another of the pincers, whether by itself then drawing the upper further down onto the shoe last or indeed releasing the drafting pressure. Such interdependence is retained in the machine in accordance with the present invention in the software for controlling the actuation of the motor means by the processor means.

There now follows a detailed description, to be read with reference to the accompanying drawing, of two machines in accordance with the invention, which machines have, it will be appreciated, been selected for description merely by way of non-limiting example of the invention.

BRIEF DESCRIPTION OF THE DRAWING

In the accompanying drawing is shown a schematic view of a pulling over and toe lasting machine in accordance with the present invention, illustrating the provision of optical scanning means in such machine and processor means by which signals generated by the optical scanning means can be manipulated for the control of pincers of the machine by which the shoe upper is tensioned over its last. The difference between the first and second machines is merely in the manipulation of data and not in the provision of different mechanical features.

DESCRIPTION OF THE PREFERRED EMBODIMENT

The machine shown diagrammatically in the drawing is essentially a conventional pulling over and toe lasting machine to which a scanning and control system have been added. The machine is thus generally similar, except as hereinafter described, to e.g. the machine described in EP-A 0 124 229 and comprises a shoe or last support (not shown) on which a shoe can be supported, bottom down, at an operating locality of the machine. Also arranged at the operating locality, in a generally U-shaped configuration about the last support, is pincer means comprising three pincers 10 arranged about the toe end of the shoe and two sets of side pincers, one arranged at each side of the pincers 10 and each set comprising three side pincers 12, there being thus provided nine pincers in all. Each of the pincers has associated therewith an actuator (not shown) by which the jaws 14 (shown only in relation to the toe pincer 10) are actuated to grip a marginal portion of the upper of a shoe placed on its last. In addition, each of the pincers has associated with it a motor 16 by which its associated pincer can be moved heightwise relative to the shoe support thus to tension the shoe upper after it has been gripped as aforesaid. The motors 16 are mounted on a plate 18 between which and the last support relative heightwise movement may take place, with the pincers 10, 12 acting as a unit, thus again to tension the upper about its last, as will be referred to hereinafter.

The scanning and control system incorporated in the aforementioned machine comprises a camera of conventional type, e.g. a two-dimensional CCD array, by which the forepart region of a shoe supported at the operating locality of the machine can be scanned. As is also conventional, such scanning may be utilised to determine the boundary between the shoe upper and the last in the topline region thereof, for which purpose the surface of the last has preferably been treated in order to provide the necessary distinction from the shoe upper, whether in terms of colour, reflectivity or indeed texture. Instead of a two-dimensional array camera, a plurality of so-called linescan cameras may alternatively be used, in which case one such camera is arranged to scan the boundary at the most toewardly point of the topline region of the shoe and two other cameras may then be spaced from the first along the topline region. Again, in such case, the shoe upper/shoe last boundary will be scanned.

Although reference is made herein to sensing the position of the boundary of the topline region at various selected portions of the shoe upper, it will of course be appreciated that other features may be utilised instead, in the same way as when an operator is manually positioning the shoe upper on the last.

In the case of the use of linescan cameras, which of course are constituted by a single linear array of cells, the information is then transmitted in the form of signals to a central processor unit 22 by which the coordinates for the boundary positions can be calculated. In the case of a single two-dimensional array camera the boundary positions are calculated by the central processor unit 22 in the same manner.

The central processor unit has integral with it, or connected with it, a memory store (not shown) in which previously taught data can be stored. This stored data may be obtained in a variety of ways: for example, the machine may have a "teach" mode in which an operator, preferably a skilled operator, manually lasts a shoe and, during such lasting operation, the position of the topline region of the shoe upper is "read" by the camera 20 (or linescan cameras) thus to provide data concerning the desired position of the shoe upper on the last, and this data is then stored as the taught data for subsequent reference. Alternatively, again by way of example, especially in the case where the shoe is designed using a CAD/CAM system, the position of the topline in the finished shoe is known and can be translated into coordinate axis values which relate to the desired position of the topline region of the shoe when placed at the operating locality of the machine.

Whichever system is utilised for achieving the set of taught data (and it is envisaged that a number of different sets of data may be stored in the memory store for ready access according to the style of shoe being operated upon) the coordinate axis data relating to the position of the selected portions of the topline regions of the shoe upper on its last (the "actual value") are compared with the set of taught data (the "should be" value) and, as necessary, correction signals are then supplied to the motors 10, 12 as appropriate to bring the actual value, which is constantly monitored, into correspondence with the "should be" value.

Using a conventional, "manual", machine the operator tends to apply any corrections necessary using the discretionary pull levers starting from the toe end and working then away from the toe, in general balancing opposed pincers in the course of the correction; it will of course be appreciated that the pincers are not specifically associated with particular parts of the shoe, so that it may be necessary, as the operator proceeds toewardly as aforesaid, to go back to a previous pincer and correct a previous correction, generally on a "trial and error" basis. In developing software for use in the machine in accordance with the present invention, a similar approach has been utilised whereby the various motors or pairs of motors receive instructions in a cascading effect away from the toe end of the shoe.

The motors 16 are n.c. motors (as hereinbefore defined) and control signals by which they are caused to operate can thus readily be supplied from the central processor unit 22; preferably said motors are stepping motors. Alternatively, however, the motors may be conventional fluid pressure operated motors, in which case actuators (not shown) are provided which receive control signals from the central processor unit and in turn control the supply of fluid under pressure (in the case of a hydraulic system) or the time during which the motors are subject to pressure (in the case of hydraulics or pneumatics).

When the shoe upper has been correctly positioned, i.e. when the actual and "should be" values coincide, the next stage in the lasting operation can be initiated, either by the operator or indeed automatically.

Two different modes of operation of the machine in accordance with the invention are envisaged. In a first mode of operation the shoe is initially placed in the machine and the marginal portions of the shoe upper are gripped by the pincers 10, 12. Thereafter with the pincers remaining in position as a unit the last support is raised relative thereto, thus tensioning the shoe upper about its last in a initial tensioning operation. As an alternative the pincers could of course be moved downwardly as a unit bodily relative to the last support. Whichever system is employed, the shoe bottom will be positioned in the correct relationship with the plane in which the wipers move in the subsequent wiping operation. The scanning of the topline region of the shoe upper then takes place and the comparison of the actual and "should be" values, representing the positions of selected portions of the topline region, takes place and the position of the shoe upper on the last is corrected by selective operation of the individual motors 16 until said values coincide.

In the second alternative with the shoe upper gripped by the pincers 10, 12 a preliminary upper tensioning operation takes place, in which the topline region of the upper is positioned, by selective operation of the individual motors 16, in an initial position such that in the subsequent tensioning operation as described in respect of the first embodiment the topline region becomes correctly positioned in relation to the shoe last; that is to say, effectively any individual tensioning of local areas of the shoe upper takes place before the main tensioning operation. To this end there is stored in the memory store of the processor unit 22 a set of taught data representing said initial position of the topline. Various factors of course affect the calculation of this initial position, e.g. the nature of the material, in particular its stretchability, and other features which affect the material when tensioning pressure is applied to it, as well as whether the drafting force is applied so as to pull to a predetermined distance or so as to pull at a specified pressure and, in the latter case, perhaps for a specified time period. One approach is thus to calculate this initial position on the basis of the first set of taught as in the case of the first embodiment.

Whichever embodiment is used, the shoe upper can thus be positioned, with its topline in the correct location, without reliance upon the skill of the operator. Moreover, whereas in the machine as described the shoe is supported bottom down (bearing in mind that such an arrangement is desirable in order to allow the operator visual control of the position of the shoe upper on the last), such control is not necessary (unless the taught data is obtained using a skilled operator as described above), the shoe may now be positioned bottom uppermost with the scanning and control system operating from beneath. Indeed, this may be perceived as having certain benefits where the shoe is automatically loaded into the machine, and indeed in terms of the accurate positioning of the shoe last itself; it will of course be appreciated that, whereas in the conventional machine the operator positions the shoe upper in relation to the last, in the system described above the shoe upper is positioned in relation to the operating locality of the machine and thus positioning the last accurately is an essential feature of such a system. Alternatively, of course, it would be possible also to identify the position of the last by a suitable scanning system and then apply corrections to the taught data in accordance with any deviation of the last from a defined position; such a system is disclosed e.g. in EP-A 0 213 909 (which of course relates to a different application, namely the correction of an adhesive-applying path of nozzles in a side lasting machine). A further advantage arises, bearing in mind that customarily grading rules are applicable to shoe uppers within a size range for a given style of shoe, in that it now becomes possible, using a machine in accordance with the invention, merely to establish a single set of taught data (or first and second sets in the case of the second embodiment) for position of the last by a suitable scanning system and then apply corrections to the taught data in accordance with any deviation of the last from a defined position; such a system is disclosed e.g. in EP-A 0 213 909 (which of course relates to a different application, namely the correction of an adhesive-applying path of nozzles in a side lasting machine). A further advantage arises, bearing in mind that customarily grading rules are applicable to shoe uppers within a size range for a given style of shoe, in that it now becomes possible, using a machine in accordance with the invention, merely to establish a single set of taught data (or first and second sets in the case of the second embodiment) for each style, which data is then graded according to the size of the shoe being operated upon. Size sensing can of course be readily achieved in a pulling over toe lasting machine by sensing the position of a heel rest (not shown) by which the shoe is engaged and held during the lasting operation; such heel rests are of course conventional.

We claim:

1. Pulling over and toe lasting machine comprising
    a last support, arranged at an operating locality of the machine, for supporting a shoe comprising a shoe upper on a last and an insole on the last bottom,
    an array of pincers, comprising at least one pincer and two sets of side pincers, arranged in a generally U-shaped configuration about the last support, by which pincers the shoe upper of a shoe supported by the last support can be gripped in the region of the lasting margin thereof,
    motor means, comprising individual n.c. motors one associated with each of the pincers, for effecting heightwise movement of the pincers, independently of one another, relative to the last support whereby a shoe upper gripped as aforesaid can be tensioned over its last,
    optical means, including a plurality of linescan cameras each arranged to scan a selected topline portion region of the shoe upper on its last and to detect a boundary point between the upper and its last at the selected portion, each of said cameras serving to generate a signal representative of the actual boundary point detected thereby and thus of the actual position of each selected topline region portion in relation to the operating locality of the machine,
    a memory in which a set of taught data representative of a desired position of each selected topline region portion is stored, and
    processor means by which the signals generated by the cameras are compared with the stored set of taught data and, if, and to the extent that, any such signal has a value which does not equal that of the taught data with which it is being compared, a correction signal is generated by the processor means, in response to which correction signal at least one of the n.c. motors is actuated appropriately to bring the selected topline region portion associated with the signal the value of which does not equal that of the taught data into a position in which said signal equals that of the taught data and thus to bring the topline region of the shoe upper into a position as represented by the taught region.

2. Machine according to claim 1 wherein further motor means is provided by which the last support is raised relative to the array of pincers thus to impart an initial tensioning to the shoe upper prior to the operation of the n.c. motors as aforesaid.

3. Machine according to claim 2 wherein the memory also stored a further set of taught data representative of a desired initial position of each selected topline region portion,
    and wherein, prior to the operation of the further motor means, the signals generated by the cameras as aforesaid are compared with said further set of taught data and, if, and to the extent that, any such signal has a value which does not equal thtat of the taught data with which it is being compared a correction signal is generated by the processor means, in response to which correction signal at least one of the n.c. motors is actuated appropriately to bring the selected topline region portion associated with the signal the value of which does not equal that of the taught data into a position in which said signal equals that of the taught data and thus to bring the topline region of the shoe upper into an initial position as represented by said further set of taught data.

4. Pulling over and toe lasting machine comprising a last support, arranged at an operating locality of the machine, for supporting a shoe comprising a shoe upper on a last and an insole on the last bottom, an array of pincers, comprising at least one pincer and two sets of side pincers, arranged in a generally U-shaped configuration about the last support, by which pincers the shoe upper of a shoe supported by the last support can be gripped in the region of the lasting margin thereof, first motor means, comprising individual n.c. motors one associated with each of the pincers, for effecting heightwise movement of the pincers, independently of one another, relative to the last support whereby a shoe upper gripped as aforesaid can be tensioned over its last, optical means, including a plurality of linescan cameras each arranged to scan a selected topline portion region of the shoe upper on its last and to detect a boundary point between the upper and its last at the selected portion, each of said cameras serving to generate a signal representative of the actual boundary point detected thereby and thus of the actual position of each selected topline region portion in relation to the operating locality of the machine, a memory in which a set of taught data representative of a desired initial position of each selected topline region portion is stored, processor means by which the signals generated by the cameras are compared with the stored set of taught data and, if, and to the extent that, any such signal has a value which does not equal that of the taught data with which it is being comparied, a correction signal is generated by the processor means, in response to which correction signal at least one of the n.c. motors is actuated appropriately to bring the selected topline region portion associated with the signal the value of which does not equal that of the taught data into a position in which said signal equals that of the taught data and thus to bring the topline region of the shoe upper into an initial position as represented by the taught data, and second motor means by which the last support is raised relative to the array of pincers after the tpline region of the shoe upper has been brought into said initial position thus to tension the shoe upper on its last and to bring the topline region thereof into its desired position.

5. Machine according to claim 4 wherein the last support is arranged to support a shoe on its last with the shoe bottom uppermost.

* * * * *